United States Patent [19]

Kaizu

[11] 3,890,465

[45] June 17, 1975

[54] CIRCUIT ARRANGEMENT FOR PROTECTION OF A SPEAKER SYSTEM

[75] Inventor: Yasuo Kaizu, Yokohama, Japan

[73] Assignee: Victor Company of Japan, Limited, Japan

[22] Filed: July 10, 1973

[21] Appl. No.: 377,969

[30] Foreign Application Priority Data

July 11, 1972 Japan .............................. 47-69448
Mar. 9, 1973 Japan .............................. 48-29364[U]

[52] U.S. Cl. .......... 179/1 VL; 317/33 R; 330/207 P

[51] Int. Cl. .............................................. H02h 3/28

[58] Field of Search .... 179/1 VL, 1 MN, 1 A, 1 SW; 317/14 C, 33 R, 148.5 R, 33 SC; 330/207 P

[56] References Cited

UNITED STATES PATENTS

| | | | |
|---|---|---|---|
| 3,351,812 | 11/1967 | Cutler et al. | 317/33 R |
| 3,555,353 | 1/1971 | Casson | 317/33 SC |
| 3,761,775 | 9/1973 | Ozawa et al. | 317/33 R |

*Primary Examiner*—Kathleen H. Claffy
*Assistant Examiner*—Tommy P. Chin
*Attorney, Agent, or Firm*—Robert E. Burns; Emmanuel J. Lobato; Bruce L. Adams

[57] ABSTRACT

Two lines normally connect an amplifier to a speaker. An electronic circuit connected between the lines senses an excessively high power surge energizing a relay switch to disconnect one of the lines. When the power surge is over, the relay switch is de-energized automatically restoring the normal connections to the speaker.

4 Claims, 3 Drawing Figures

CIRCUIT ARRANGEMENT FOR PROTECTION OF A SPEAKER SYSTEM

This invention relates generally to loudspeakers, and particularly to a circuit arrangement for cutting off a signal input to a loudspeaker when the signal is in excess of a predetermined level so as to prevent damage to the loudspeaker.

Because loudspeakers are required to be responsive to a wide range of signal amplitudes, careful consideration is always given to the design of the speaker's voice coil and diaphragm coupled therewith. However, in case the input level is incidentally raised due to an improper manual adjustment of the volume control or introduction of a current surge induced by a lightning, the current in the speaker circuit would be excessive and the loudspeaker would be severely damaged.

The speaker system may conventionally be protected from such accidents by means of a fuse arrangement connected in series with the voice coil. However, the fuse, when blown off, would cause a cut-off in the circuit from which the circuit could not be automatically restored to its normal operating condition.

In accordance with the present invention, there is provided a circuit arrangement which automatically cuts off input signals when they exceed an allowable limit of the loudspeaker and automatically restores its condition to normal as soon as the input level returns to within the normal range. The circuit arrangement comprises input terminals to receive signals from an amplifying unit and output terminals connected to the input terminals for direct delivery of the input signals when the signals are within the normal range, and means responsive to signals in excess of a predetermined level for energizing a relay to cut off the input circuit to the loudspeaker.

The features and advantages of the present invention will be better understood from the following description taken in conjunction with the accompanying drawings, in which.

Figure 1:
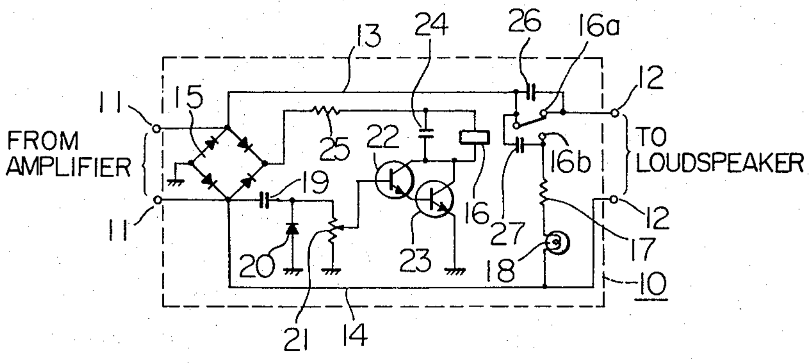
FIG. 1 is a circuit diagram of a first preferred embodiment of the invention.

In FIG. 1 there is shown a circuit arrangement of a first preferred embodiment of the invention generally indicated at reference numeral 10. The circuit 10 comprises input terminals 11 to receive signals from the final stage of an amplifier unit (not shown). The terminals 11 are connected to output terminals 12 via lines 13 and 14 for delivery of the signals to a loudspeaker (not shown). Part of the signals is rectified by a full-wave rectifier circuit 15 of a conventional four-diode network connected across the input terminals to serve as a direct current source for a relay 16 which will be activated when the input exceeds a certain level as will be explained hereinbelow. The relay 16 is connected at one ter nina1 thereof to one of the intersecting points of the r :ctifier 15 via a resistor 25 and has its normally engage l contact 16a connected to the line 13 and its normal y disengaged contact 16b connected across the lines 13 and 14 via a resistor 17 and a lamp 18. Part of the signals supplied to the input terminals is also branched off to a capacitor 19 and rectified by a diode 20 to develop a voltage there-across which is tapped by a variable resistor 21 and fed to the base electrode of a couple of transistors 22 and 23 which are connected in a manner to form a Darlington amplifier. The collector electrodes of the transistors are connected to the relay 16 so that when the input signal level exceeds a given reference level determined by the setting of the variable resistor 21, the two transistors are rendered conductive to energize the relay 16 disengaging the contact 16*a* and engaging the contact 16*b*. Under these conditions, the line 13 is disconnected to cut off the input signal which is switched by the engaged contact 16*b* to the resistor 17 and the lamp 18 which is caused to light up indicating that the signals at the input terminals are in excess of a given signal level and the loudspeaker is isolated from the relevant circuitry. As soon as the input level drops to within the normal range, the transistors are instantly rendered nonconductive to release the relay 16 and its contacts 16*a* and 16*b* are respectively engaged and disengaged. A capacitor 24 is connected across the relay 16 to absorb short surge input signals which might cause instantaneous, frequent operations of the relay by allowing the relay 16 to remain released or de-energized for a certain period of time until the duration of the surge signals is such that the loudspeaker would be adversely affected. In the embodiment described hereinabove, a conventional relay of a relatively fast acting type is used. If a slow-acting type relay is employed as the relay 16, the capacitor 24 may be omitted. Capacitors 26 and 27 are connected across the contacts 16*a* and 16*b* for the purpose of quenching the spark generated each time the contacts are engaged and disengaged.

Figure 2:
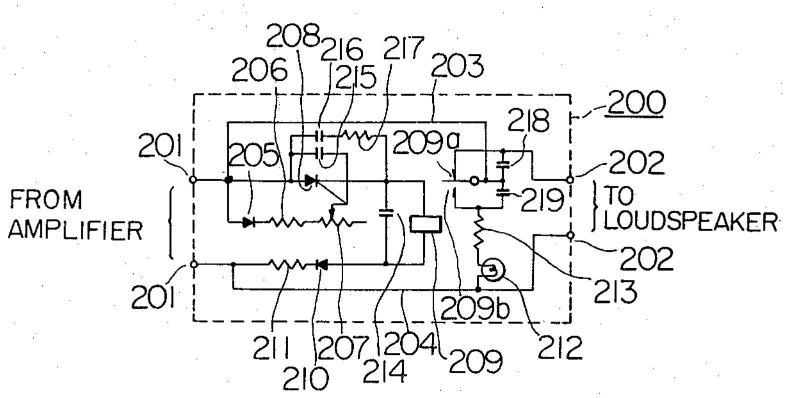
FIG. 2 is a circuit diagram of a second preferred embodiment of the invention.

A circuit arrangement of a second preferred embodiment of the invention is shown in FIG. 2 and generally indicated at numeral 200 comprising input terminals 201 and output terminals 202 connected thereto respectively by lines 203 and 204. Signals from the final stage of an amplifier unit are fed into the input terminals 201 and a greater part thereof is allowed to pass through the lines 203 and 204 to the output terminals 202. A small part of the input signals are branched off at the input terminals to a circuit comprising a diode 205, a resistor 206, a variable resistor 207, the gate control electrode of a thyristor 208, a relay 209, a diode 210 and a resistor 211. The voltage setting of the variable resistor 207 determines the reference voltage at which the thyristor starts conducting. When the input level exceeds the reference voltage level, the thyristor is rendered conductive to energize the relay 209 which remains operated by the rectified current derived from the input terminals. Under these conditions, the line 203 is disconnected because the normally engaged contact 209*a* is now disengaged and the engagement of the normally disengaged contact 209*b* completes a circuit for a lamp 212 and a resistor 213, causing the lamp to light up for indication of the abnormal condition of the circuit as previously described. A capacitor 214 is connected across the relay 209. The provision of the capacitor 214 is not only for purposes of absorbing short surge pulses as previously described in connection with the FIG. 1 embodiment (capacitor 24), but for purposes of discharging a back current to the thyristor 208 to render it nonconductive as soon as the input level drops to a normal level. An RC network which comprises capacitors 215 and 216 and a resistor 217 is provided for protection of the thyristor from an excessive surge voltage supplied to the input terminals.

Capacitors 218 and 219 are provided across the contacts 209*a* and 209*b*, respectively, for purposes of quenching the sparks generated as previously described. While the gate circuit of the thyristor comprises a resistor network, the gate circuit may be provided with an additional LC network to provide a desired frequency response to the surge input which frequently occurs in that frequency range.

Figure 3:
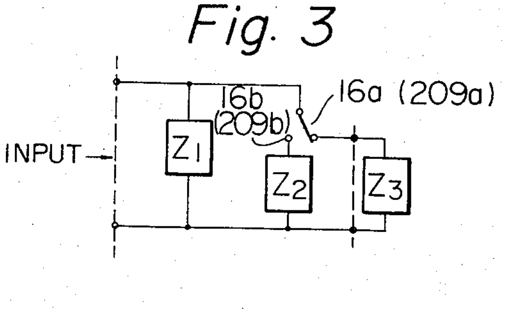
FIG. 3 is an equivalent circuit of the embodiments of the invention.

FIG. 3 illustrates an equivalent circuit of the above-described preferred embodiment of the invention. $Z_1$ represents the impedance of the input circuit including the relay 16 or 209 measured when the relay is energized, $Z_2$ represents the impedance of the lamp circuit and $Z_3$ the input impedance of the speaker system. If the resultant parallel resistance of $Z_1$ and $Z_2$ is extremely lower than $Z_3$, a large current would be produced in the collector circuit of the final stage of the amplifier unit. To prevent the passage of a large current, the resultant resistance should preferably be equal or greater than $Z_3$, that is $$Z_3 \leqq \frac{Z_1 \cdot Z_2}{Z_1 + Z_2}.$$

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A loudspeaker protection circuit for cutting off an input signal applied to a loudspeaker when the input signal exceeds a predetermined level, comprising:

a. input means for receiving an input signal;

b. output means for applying the input signal to said loudspeaker;

c. circuit means including a relay having a normally closed contact electrically connecting said input means to said output means for applying the input signal to the output means;

d. first rectifying means receptive of the input signal for developing a first rectified signal representative of the amplitude of the input signal;

e. a control device having a conductive state and a non-conductive state and a control electrode for receiving a signal to control its conductive state;

f. second rectifying means receptive of the input signal for developing a second rectified signal representative of the amplitude of the input signal;

g. means applying said second rectified signal to said control electrode of said control element; and h. means electrically connecting said first rectifying means with said control device and said relay to energize said relay with said first rectified signal to open said normally closed contact and disconnect said output means from said input means when said first rectified signal exceeds a predetermined level determined by said second rectified signal.

2. A loudspeaker protection circuit according to claim 1, wherein said control device comprises a Darlington pair of transistors.

3. A loudspeaker protection circuit according to claim 1, wherein said control device comprises a thyristor.

4. A loudspeaker protection circuit according to claim 1, wherein said second rectifying means comprises means for adjusting the amplitude of the second rectified signal relative to the input signal to control the predetermined level of said first rectified signal at which said relay is energized.

* * * * *